United States Patent
Coster et al.

(12) 
(10) Patent No.: US 6,800,575 B1
(45) Date of Patent: Oct. 5, 2004

(54) DEEP COLOURED GREEN-TO-BLUE SHADE SODA-LIME GLASS

(75) Inventors: Dominique Coster, Temploux (BE); Marc Foguenne, Saint-Denis (BE)

(73) Assignee: Glaverbel, S.A., Brussels (BE)

( * ) Notice: Subject to any disclaimer, the term of this patent is extended or adjusted under 35 U.S.C. 154(b) by 0 days.

(21) Appl. No.: 09/744,932

(22) PCT Filed: Jul. 26, 1999

(86) PCT No.: PCT/BE99/00094

§ 371 (c)(1),
(2), (4) Date: Mar. 26, 2001

(87) PCT Pub. No.: WO00/07952

PCT Pub. Date: Feb. 17, 2000

(30) Foreign Application Priority Data

Jul. 31, 1998 (FR) .............................. 98 10020

(51) Int. Cl.⁷ ........................... C03C 3/087; C03C 4/10; C03C 4/08
(52) U.S. Cl. ........................... 501/71; 501/70; 501/904; 501/905
(58) Field of Search ............................ 501/64, 70, 71, 501/904, 905

(56) References Cited

U.S. PATENT DOCUMENTS

| | | | | |
|---|---|---|---|---|
| 4,792,536 A | * | 12/1988 | Pecoraro et al. | ............... 501/70 |
| 5,087,525 A | * | 2/1992 | Goodman et al. | ........... 428/216 |
| 5,393,593 A | * | 2/1995 | Gulotta et al. | ............... 428/212 |
| 6,413,893 B1 | * | 7/2002 | Shelestak et al. | ............. 501/70 |

FOREIGN PATENT DOCUMENTS

EP   0 825 156 A1 * 2/1998 ........... C03C/3/087

OTHER PUBLICATIONS

Copy of Abandoned Application 08/869,221.*
Copy of US–6,413,893 with markings showing the difference between itself and Application 08/869,221.*

* cited by examiner

*Primary Examiner*—Karl Group
*Assistant Examiner*—Elizabeth A. Bolden
(74) *Attorney, Agent, or Firm*—Piper Rudnick LLP; Jerold I. Schneider

(57) ABSTRACT

The invention concerns a coloured soda-lime glass deep coloured with a green-to-blue shade. It contains 0.40 to 0.52 wt. % of FeO, present under illuminant A and for a glass thickness of 4 mm, a light transmittance (TLA4) less than 70%, a selectivity (SE4) higher than 1.65 and an ultraviolet radiation transmittance (TUV4) less than 8%. Said glass is particularly suited for lateral rear glazing and rear glazing for motor vehicles.

15 Claims, No Drawings

DEEP COLOURED GREEN-TO-BLUE SHADE SODA-LIME GLASS

CROSS REFERENCE TO RELATED APPLICATIONS

This application is based upon, and claims priority from International Application No., PCT/BE99/00094 filed Jul. 26, 1999, and French Application No. 98/10020 filed Jul., 31, 1998, both of which are hereby incorporated by reference.

BACKGROUND OF THE INVENTION

The present invention relates to a deep-colored soda-lime glass of green-to-blue shade, composed of glass-forming principal constituents and of coloring agents.

The expression "soda-lime glass" is used here in a wide sense and relates to any glass which contains the following constituents (in percentages by weight):

| | |
|---|---|
| $Na_2O$ | 10 to 20% |
| CaO | 0 to 16% |
| $SiO_2$ | 60 to 75% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |

This type of glass is very widely used in the field of glazing for buildings or automobiles, for example. It is usually manufactured in the form of a ribbon by the drawing or float process. Such a ribbon can be cut into sheets which can then be bent or can undergo a treatment to improve the mechanical properties, for example a thermal toughening step.

When referring to the optical properties of a glass sheet, it is generally necessary to relate these properties to a standard illuminant. In the present description, two standard illuminants are used, namely illuminant C and illuminant A defined by the Commission Internationale de l'Eclairage (C.I.E.). Illuminant C represents average daylight having a color temperature of 6700 K. This illuminant is especially useful for evaluating the optical properties of glazing intended for buildings. Illuminant A represents the radiation of a Planck radiator with a temperature of about 2856 K. This illuminant describes the light emitted by car headlights and is essentially intended to evaluate the optical properties of windows intended for automobiles. The Commission Internationale de l'Eclairage has also published a document entitled "Colorimétrie, Recommandations Officielles de la C.I.E. [Colorimetry and Official Recommendations of the C.I.E.]" (May 1970) which describes a theory in which the calorimetric coordinates for light of each wavelength of the visible spectrum are defined so as to be able to be represented on a diagram having orthogonal axes x and y, called the C.I.E. trichromatic diagram. This trichromatic diagram shows the location representative of light of each wavelength (expressed in nanometers) of the visible spectrum. This location is called the "spectrum locus" and light whose coordinates lie on this spectrum locus is said to have 100% excitation purity for the appropriate wavelength. The spectrum locus is closed by a line called the purple boundary which connects the points of the spectrum locus whose coordinates correspond to wavelengths of 380 nm (violet) and 780 nm (red). The area lying between the spectrum locus and the purple boundary is that available for the trichromatic coordinates of any visible light. The coordinates of the light emitted by illuminant C, for example, correspond to x=0.3101 and y=0.3162. This point C is regarded as representing white light and consequently has an excitation purity equal to zero for any wavelength. Lines may be drawn from the point C to the spectrum locus at any desired wavelength and any point lying on these lines may be defined not only by its x and y coordinates but also as a function of the wavelength corresponding to the line on which it lies and on its distance from the point C relative to the total length of the wavelength line. Consequently, the color of the light transmitted by a colored glass sheet may be described by its dominant wavelength and its excitation purity expressed as a percentage.

In fact, the C.I.E. coordinates of light transmitted by a colored glass sheet will depend not only on the composition of the glass but also on its thickness. In the present description, and in the claims, all the values of the excitation purity P, of the dominant wavelength $\lambda_D$ of the transmitted light, and of the light transmission factor of the glass (TLC5) are calculated from the spectral specific internal transmissions ($SIT_\lambda$) of a glass sheet 5 mm in thickness. The spectral specific internal transmission of a glass sheet is governed solely by the absorption of the glass and can be expressed by the Beer-Lambert law:

$SIT_\lambda = e^{-E \cdot A_\lambda}$ where $A_\lambda$ is the absorption coefficient (in $cm^{-1}$) of the glass at the wavelength in question and E is the thickness (in cm) of the glass. To a first approximation, $SIT_\lambda$ may also be represented by the formula:

$$(I_{3\lambda}+R_{2\lambda})/(I_{1\lambda}-R_{1\lambda})$$

where $I_{1\lambda}$ is the intensity of the visible light incident on a first face of the glass sheet, $R_{1\lambda}$ is the intensity of the visible light reflected by this face, $I_{3\lambda}$ is the intensity of the visible light transmitted from the second face of the glass sheet and $R_{2\lambda}$ is the intensity of the visible light reflected by this second face toward the interior of the sheet.

In the description which follows and in the claims, the following are also used:

for illuminant A, the total light transmission (TLA) measured for a thickness of 4 mm (TLA4). This total transmission is the result of the integration between the 380 and 780 nm wavelengths of the expression: $\Sigma T_\lambda \cdot E_\lambda \cdot S_\lambda / \Sigma E_\lambda \cdot S_\lambda$ in which $T_\lambda$ is the transmission at the wavelength $\lambda$, $E_\lambda$ is the spectral distribution of illuminant A and $S_\lambda$ is the sensitivity of the normal human eye as a function of the wavelength $\lambda$;

the total energy transmission (TE) measured for a thickness of 4 mm (TE4). This total transmission is the result of the integration between the 300 and 2150 nm wavelengths of the expression: $\Sigma T_\lambda \cdot E_\lambda / \Sigma E_\lambda$ in which $E_\lambda$ is the spectral energy distribution of the sun at 30° above the horizon;

the selectivity (SE) measured as the ratio of the total light transmission for illuminant A to the total energy transmission (TLA/TE);

the total transmission in the ultraviolet, measured for a thickness of 4 mm (TUV4). This total transmission is the result of the integration between 280 and 380 nm of the expression: $\Sigma T_\lambda \cdot U_\lambda / \Sigma U_\lambda$ in which $U_\lambda$ is the spectral distribution of the ultraviolet radiation that has passed through the atmosphere, defined in the DIN 67507 standard.

SUMMARY OF THE INVENTION

The present invention relates in particular to dark-colored glasses of green-to-blue shade. These glasses are generally chosen for their protective properties with respect to solar radiation and their use in buildings is known. They are used in architecture and for partially glazing certain vehicles or railroad compartments.

The present invention relates to a highly selective dark glass of green-to-blue shade which is especially appropriate for use in the make-up of car windows and in particular as rear side windows and as rear window. This is because it is important in the automobile field for the windows of vehicles to provide sufficient light transmission while having as low as possible an energy transmission so as to prevent any overheating of the passenger space in sunny weather. Such glazing may be laminated and may then comprise one or more sheets of glass according to the invention.

The invention provides a colored soda-lime glass composed of glass-forming principal constituents and of coloring agents, which contains from 0.40 to 0.52% by weight of FeO and has, under illuminant A and for a glass thickness of 4 mm, a light transmission (TLA4) of less than 70%, a selectivity (SE4) of greater than 1.65 and an ultraviolet radiation transmission (TUV4) of less than 8%.

The combination of these optical properties is particularly advantageous in that it offers, while ensuring light transmission through the glass sufficient for the uses for which it is intended, a high selectivity value and a low transmission value in the ultraviolet. This makes it possible to avoid both the internal heating of the volumes bounded by windows according to the invention, thereby saving energy when air-conditioning systems are used in said volumes, and the esthetically unattractive discoloration of objects placed inside these volumes, due to the effect of the ultraviolet solar radiation.

Preferably, the glass according to the invention has a selectivity (SE4) of greater than or equal to 1.70, preferably greater than or equal to 1.75. Such selectivity values make it possible to optimize the effectiveness of the thermal filtering of a window for a given light transmission and consequently to improve the comfort within glazed spaces by limiting the extent to which they become overheated when exposed to strong sunlight.

Preferably, the glass according to the invention has a light transmission of greater than 15%, preferably greater than 20%, and less than 50%, preferably less than 45%. These values are well suited to the use of the glass as rear side windows and as rear windows of vehicles.

Advantageously, the dominant wavelength of the glass according to the invention is less than 550 nm, preferably less than 520 nm. Glasses of a shade satisfying these upper limits are regarded as esthetically attractive.

It is preferable that a colored glass according to the invention has a color purity in transmission (P) of greater than 9%, even more preferably greater than 10%. Such purity values give the glass a level of coloration which is appreciated in their specific uses.

Iron is in fact present in most commercially available glasses either as an impurity or introduced deliberately as a coloring agent. The presence of $Fe^{3+}$ gives the glass a slight absorption of visible light of short wavelength (410 and 440 nm) and a very strong absorption band in the ultraviolet (absorption band centered on 380 nm), whereas the presence of $Fe^{2+}$ ions causes a strong absorption in the infrared (absorption band centered on 1050 nm). The ferric ions give the glass a slight yellow coloration, whereas the ferrous ions give a more pronounced blue-green coloration. All other considerations being equal, it is the $Fe^{2+}$ ions which are responsible for the absorption in the infrared range and which therefore determine the TE. The TE value decreases, thereby increasing the SE value, as the $Fe^{2+}$ concentration increases. By favoring the presence of $Fe^{2+}$ ions over $Fe^{3+}$ ions, a high selectivity is therefore obtained.

Preferably, the glass according to the invention contains, as coloring agent, in addition to iron, at least one of the elements chromium, cobalt, vanadium, selenium, titanium, cerium and manganese. The addition of very small amounts of these elements makes it possible to adjust the optical properties of the glass in an optimum fashion and, especially, to obtain a highly selective glass.

It is possible to produce a glass having roughly a color similar to that of the glass according to the invention using, in particular, nickel as coloring agent. However, the presence of nickel has drawbacks, especially when the glass must be produced by the float process. In the float process, a ribbon of hot glass is conveyed along the surface of a bath of molten tin so that its faces are plane and parallel. In order to prevent oxidation of the tin on the surface of the bath, which would lead to tin oxide being entrained by the ribbon, a reducing atmosphere is maintained above the bath. When the glass contains nickel, this is partially reduced by the atmosphere above the tin bath, giving rise to a haze in the glass produced. This element is also unpropitious to obtaining a high selectivity value of the glass which contains it, since it does not absorb light in the infrared range, resulting in a high TE value. In addition, nickel present in the glass can form the sulfide NiS. This sulfide exists in various crystalline forms which are stable in different temperature ranges, and the transformations of which, from one form to another, create problems when the glass has to be reinforced by a thermal toughening treatment, as is the case in the automobile field and also in the case of certain glazing products for buildings (balconies, spandrels, etc.). The glass according to the invention, which contains no nickel, is therefore particularly well suited to being manufactured by the float process and to architectural use or in the field of motor vehicles or the like.

The effects of the various coloring agents individually envisioned for producing a glass are the following (according to "Le Verre [Glass]" by H. Scholze, translated by J. Le Dû, Institut du Verre [Glass Institute], Paris):

cobalt: the $[Co^{II}O_4]$ group produces an intense blue coloration;

chromium: the presence of the $[Cr^{III}O_6]$ group gives rise to absorption bands at 650 nm and a light green color. More extensive oxidation gives rise to the $[Cr^{VI}O^4]$ group which creates a very intense absorption band at 365 nm and gives a yellow coloration;

vanadium: for increasing contents of alkali metal oxides, the color changes from green to colorless, this being caused by the oxidation of the $[V^{III}O_6]$ group into $[V^{V}O_4]$.

selenium: the $Se^{4+}$ cation has virtually no coloring effect, whereas the uncharged element $Se^0$ gives a pink coloration. The $Se^{2-}$ anion forms a chromophore with the ferric ions present and consequently gives the glass a red-brown color;

titanium: the $TiO_2$ introduced into the glass in a sufficient amount makes it possible to obtain, by reduction, $[Ti^{III}O_6]$ which colors in the violet or $[Ti^{IV}O_4]$. This coloration may also change to maroon;

manganese: the $[Mn^{III}O_6]$ group in glasses rich in alkali metals creates a violet color;

cerium: the presence of cerium ions in the composition makes it possible to obtain a strong absorption in the ultraviolet range. Cerium oxide exists in two forms: [$Ce^{IV}$] absorbs in the ultraviolet around 240 nm and [$Ce^{III}$] absorbs in the ultraviolet around 314 nm.

The energy and optical properties of a glass containing several coloring agents are therefore the result of a complex interaction between them. In fact, the behavior of these coloring agents depends greatly on their redox state and therefore on the presence of other elements liable to influence this state.

In preferred embodiments, the glass according to the invention has optical properties which lie within the ranges defined below:

20%<TLA4<40%
15%<TE4<25%
0%<TUV4<5%
480 nm<$\lambda_D$<520 nm
10%<P<20%.

The light transmission range thus defined makes the glass according to the invention particularly useful for reducing the dazzling effect produced by the light from automobile headlights when it is used for the rear side windows or as the rear window of vehicles. The corresponding energy transmission range provides the glass with its high selectivity. As regards the dominant-wavelength and excitation-purity ranges, these correspond to shades and intensity of color which are found to be particularly attractive, especially according to present-day tastes in the architectural and automotive fields.

These properties are obtained from the following percentages by weight of coloring agents, the total amount of iron being expressed in the form of $Fe_2O_3$:

| | |
|---|---|
| $Fe_2O_3$ | 1.2 to 1.85% |
| FeO | 0.40 to 0.50% |
| Co | 0.0020 to 0.0130% |
| $Cr_2O_3$ | 0 to 0.0240% |
| $V_2O_5$ | 0 to 0.1%. |
| Se | 0 to 0.0015% |

The use of vanadium as coloring agent has the advantage of limiting the production costs of the glass according to the invention because of the inexpensive nature of this element. Moreover, vanadium is also beneficial in environmental protection terms, due to its low polluting character, and in obtaining the low ultraviolet radiation transmission value of the glass according to the invention. Vanadium also has a high absorption in the infrared radiation range, which helps in obtaining a glass having a low energy transmission and a high selectivity. As regards chromium, its use is not unfavorable to the preservation of the refractory walls of the furnace for manufacturing the glass with respect to which walls chromium poses no risk of corrosion. The use of selenium as coloring agent makes it possible to obtain a more neutral, that is to say more grayish, glass than those not containing this agent.

According to certain especially preferred embodiments, the glass according to the invention has optical properties lying within the following ranges:

25%<TLA4<35%
15%<TE4<20%
0%<TUV4<3.5%
495 nm<$\lambda_D$<500 nm
10%<P<15%.

Glass having optical properties lying within the more restricted ranges defined above is particularly efficient since it combines optimal light- and energy-transmission properties for use as rear side windows and rear window of a vehicle. In its architectural use, it combines its esthetic qualities with a considerable energy saving due to less stress on the air-conditioning systems. In the uses in question, it is preferable that the glass according to the invention have a TLA4 of less than 30%, even more preferably less than 28%.

Such properties are obtained from the following percentages by weight of coloring agents, the total amount of iron being expressed in the form of $Fe_2O_3$:

| | |
|---|---|
| $Fe_2O_3$ | 1.45 to 1.85% |
| FeO | 0.40 to 0.45% |
| Co | 0.0030 to 0.0120% |
| $Cr_2O_3$ | 0.0190 to 0.0230% |
| $V_2O_5$ | 0.0350 to 0.0550% |
| Se | 0 to 0.0010% |

It is noteworthy that glasses according to the invention containing selenium have a selectivity of greater than or equal to 1.65. Nevertheless, it is preferred for the glass according to the invention not to contain this coloring agent, which is expensive and is incorporated into the glass with a low efficiency.

Preferably, the glass according to the invention has a percentage by weight of FeO of greater than 0.42.

The glass according to the invention is preferably used in the form of sheets having a thickness of 3 or 4 mm for the rear side panes and the rear window of vehicles and thicknesses of more than 4 mm in buildings. When the glass according to the invention is used in the make-up of laminated glazing, it is preferably used in thicknesses of about 2 mm.

The glass according to the invention also preferably has a total light transmission under illuminant C, for a thickness of 5 mm (TLC5) of between 15 and 35%, which makes it conducive to eliminating the dazzling effect of sunlight when it is used in buildings.

The glass according to the invention may be coated with a layer of metal oxides which reduce its heating by solar radiation and consequently that of the passenger compartment of a vehicle or of a room in a building using such a glass as glazing.

The glasses according to the present invention may be manufactured by conventional processes. In terms of batch materials, it is possible to use natural materials, recycled glass, scoria or a combination of these materials. The colorants are not necessarily added in the form indicated, but this manner of giving the amounts of coloring agents added, in equivalents in the forms indicated, corresponds to standard practice. In practice, the iron is added in the form of red iron oxide or of compounds containing reduced iron (FeO), the cobalt is added in the form of hydrated sulfate, such as $CoSO_4.7H_2O$ or $CoSO_4.6H_2O$, or of oxides, and the chromium is added in the form of dichromate, such as $K_2Cr_2O_7$. As regards vanadium, this is introduced in the form of sodium oxide or sodium vanadate. The cerium is introduced in the form of oxide or carbonate. The selenium is added in elemental form or in the form of selenite, such as $Na_2SeO_3$ or $ZnSeO_3$. The titanium is introduced in the form of $TiO_2$ or of a mixed oxide. As regards the manganese, this is introduced in the form of oxide or salt.

Other elements are sometimes present as impurities in the batch materials used for manufacturing the glass according to the invention, whether in the natural materials, in the recycled glass or in the scoria, but when the presence of these impurities does not give the glass properties lying outside the limits defined above, these glasses are regarded as being in accordance with the present invention.

DETAILED DESCRIPTION OF PREFERRED EMBODIMENTS

The present invention will be illustrated by the following specific examples of optical properties and compositions.

EXAMPLES 1 to 55

Table I gives, by way of nonlimiting indication, the base composition of the glass and the constituents of the glass batch to be melted in order to produce the glasses according to the invention. Tables IIa and IIb give the optical properties and the proportions by weight of the coloring agents of a glass containing or not containing selenium among its coloring agents. These proportions are determined by X-ray fluorescence of the glass and are converted into the molecular species indicated.

The glass mixture may, if necessary, contain a reducing agent, such as coke, graphite or slag, or an oxidizing agent, such as nitrate. In this case, the proportions of the other materials are adapted so that the composition of the glass remains unchanged.

TABLE I

| Composition of the base glass | | Constituents of the base glass | |
|---|---|---|---|
| $SiO_2$ | 71.5 to 71.9% | Sand | 571.3 |
| $Al_2O_3$ | 0.8% | Feldspar | 29.6 |
| CaO | 8.8% | Lime | 35.7 |
| MgO | 4.2% | Dolomite | 167.7 |
| $Na_2O$ | 14.1% | $Na_2CO_3$ | 189.4 |
| $K_2O$ | 0.1% | Sulfate | 5.0 |
| $SO_3$ | 0.05 to 0.45% | | |

TABLE IIa

| Ex | $Fe_2O_3$ (%) | FeO (%) | Co (ppm) | $V_2O_5$ (ppm) | $Cr_2O_3$ (ppm) | Se (ppm) | $\lambda_D^*$ (nm) | P (%) | TLA4 (%) | TE4 (%) | SE4 | TUV4 (%) |
|---|---|---|---|---|---|---|---|---|---|---|---|---|
| 1 | 1.80 | 0.49 | 31 | 261 | 20 | 2 | 505.4 | 9.5 | 34.0 | 18.4 | 1.85 | 0.9 |
| 2 | 1.70 | 0.44 | 61 | 51 | 34 | 3 | 495.3 | 12.0 | 35.1 | 19.4 | 1.80 | 1.2 |
| 3 | 1.81 | 0.45 | 58 | 10 | 237 | 9 | 526.3 | 8.4 | 30.3 | 15.8 | 1.92 | 2.0 |
| 4 | 1.67 | 0.45 | 75 | 950 | 124 | 5 | 505.3 | 8.7 | 29.9 | 16.7 | 1.79 | 0.6 |
| 5 | 1.71 | 0.43 | 81 | 354 | 9 | 3 | 494.0 | 12.7 | 31.8 | 18.3 | 1.74 | 1.2 |
| 6 | 1.58 | 0.42 | 67 | 519 | 168 | 14 | 528.6 | 7.2 | 31.4 | 18.4 | 1.71 | 2.1 |
| 7 | 1.68 | 0.42 | 78 | 215 | 7 | 12 | 500.2 | 7.2 | 30.7 | 18.3 | 1.68 | 1.7 |
| 8 | 1.42 | 0.41 | 78 | 7 | 241 | 8 | 494.0 | 13.1 | 31.9 | 18.3 | 1.74 | 5.0 |
| 9 | 1.55 | 0.43 | 82 | 910 | 78 | 3 | 495.0 | 13.3 | 30.0 | 17.1 | 1.76 | 1.5 |
| 10 | 1.47 | 0.41 | 69 | 257 | 175 | 9 | 498.4 | 9.6 | 32.6 | 18.5 | 1.76 | 3.7 |
| 11 | 1.63 | 0.41 | 75 | 497 | 15 | 12 | 502.4 | 6.9 | 29.5 | 17.2 | 1.71 | 1.4 |

TABLE IIb

| Ex | $Fe_2O_3$ (%) | FeO (%) | Co (ppm) | $V_2O_5$ (ppm) | $Cr_2O_3$ (ppm) | $\lambda_D^*$ (nm) | P (%) | TLA4 (%) | TE4 (%) | SE4 | TUV4 (%) |
|---|---|---|---|---|---|---|---|---|---|---|---|
| 12 | 1.68 | 0.46 | 59 | 343 | 197 | 500.7 | 11.2 | 32.8 | 17.2 | 1.91 | 2.2 |
| 13 | 1.62 | 0.44 | 60 | 707 | 199 | 501.6 | 10.8 | 32.9 | 17.5 | 1.88 | 2.2 |
| 14 | 1.62 | 0.43 | 76 | 469 | 197 | 495.9 | 14.0 | 31.6 | 17.4 | 1.82 | 2.6 |
| 15 | 1.66 | 0.43 | 72 | 710 | 100 | 497.4 | 12.2 | 31.8 | 17.4 | 1.83 | 1.9 |
| 16 | 1.59 | 0.43 | 100 | 397 | 200 | 491.9 | 18.2 | 28.7 | 16.5 | 1.74 | 2.5 |
| 17 | 1.57 | 0.43 | 82 | 465 | 203 | 494.4 | 15.1 | 31.8 | 17.8 | 1.79 | 2.9 |
| 18 | 1.59 | 0.42 | 103 | 782 | 193 | 492.9 | 17.3 | 28.0 | 16.3 | 1.72 | 2.2 |
| 19 | 1.63 | 0.42 | 74 | 525 | 201 | 497.7 | 12.7 | 32.2 | 17.6 | 1.83 | 2.4 |
| 20 | 1.52 | 0.42 | 104 | 399 | 108 | 489.3 | 20.1 | 30.4 | 17.9 | 1.70 | 3.1 |
| 21 | 1.59 | 0.42 | 58 | 409 | 197 | 496.5 | 13.5 | 30.8 | 17.2 | 1.79 | 2.2 |
| 22 | 1.59 | 0.42 | 63 | 711 | 190 | 502.4 | 10.3 | 33.5 | 18.2 | 1.84 | 2.1 |
| 23 | 1.66 | 0.41 | 102 | 623 | 199 | 494.3 | 15.6 | 28.4 | 16.6 | 1.72 | 1.9 |
| 24 | 1.83 | 0.50 | 122 | 307 | 137 | 495.9 | 14.2 | 22.1 | 12.2 | 1.81 | 0.5 |
| 25 | 1.71 | 0.48 | 60 | 510 | 150 | 499.9 | 11.6 | 31.5 | 15.9 | 1.98 | 1.6 |
| 26 | 1.51 | 0.42 | 80 | 462 | 292 | 496.5 | 14.3 | 31.3 | 17.4 | 1.80 | 3.1 |
| 27 | 1.64 | 0.42 | 92 | 426 | 295 | 496.4 | 14.5 | 29.2 | 16.5 | 1.77 | 2.2 |
| 28 | 1.57 | 0.42 | 72 | 469 | 204 | 496.6 | 13.1 | 33.4 | 18.4 | 1.81 | 2.8 |
| 29 | 1.63 | 0.41 | 84 | 497 | 202 | 495.9 | 14.0 | 31.0 | 17.4 | 1.79 | 2.3 |
| 30 | 1.56 | 0.40 | 62 | 329 | 204 | 498.3 | 11.7 | 35.5 | 19.4 | 1.83 | 3.0 |
| 31 | 1.51 | 0.42 | 80 | 462 | 205 | 494.4 | 15.3 | 32.1 | 17.9 | 1.80 | 1.7 |
| 32 | 1.64 | 0.42 | 92 | 426 | 210 | 494.2 | 15.4 | 29.9 | 17.0 | 1.76 | 1.6 |
| 33 | 1.80 | 0.47 | 60 | 260 | 6 | 496.2 | 12.2 | 32.8 | 17.1 | 1.92 | 1.8 |
| 34 | 1.78 | 0.49 | 82 | 0 | 102 | 492.4 | 16.9 | 29.8 | 15.7 | 1.90 | 2.3 |
| 35 | 1.79 | 0.48 | 109 | 516 | 200 | 493.9 | 17.2 | 25.2 | 13.8 | 1.83 | 1.6 |
| 36 | 1.69 | 0.49 | 86 | 261 | 206 | 494.3 | 16.4 | 28.4 | 14.9 | 1.91 | 2.3 |
| 37 | 1.68 | 0.48 | 103 | 576 | 101 | 490.9 | 19.8 | 26.0 | 14.4 | 1.81 | 1.9 |
| 38 | 1.59 | 0.49 | 63 | 431 | 36 | 492.8 | 15.9 | 32.5 | 16.9 | 1.92 | 2.7 |
| 39 | 1.53 | 0.47 | 36 | 75 | 213 | 501 | 10.9 | 36.3 | 18.1 | 2.01 | 3.2 |

TABLE IIb-continued

| Ex | Fe$_2$O$_3$ (%) | FeO (%) | Co (ppm) | V$_2$O$_5$ (ppm) | Cr$_2$O$_3$ (ppm) | $\lambda_D$* (nm) | P (%) | TLA4 (%) | TE4 (%) | SE4 | TUV4 (%) |
|----|------|-------|-----|-----|-----|-------|------|------|------|------|------|
| 40 | 1.39 | 0.45  | 108 | 750 | 114 | 488.2 | 22.8 | 30.0 | 17.3 | 1.73 | 4.4 |
| 41 | 1.23 | 0.48  | 88  | 0   | 109 | 486.5 | 25.5 | 33.8 | 18.6 | 1.82 | 7.7 |
| 42 | 1.22 | 0.49  | 61  | 455 | 15  | 487   | 23.1 | 36.7 | 19.6 | 1.87 | 7.2 |
| 43 | 1.42 | 0.44  | 46  | 65  | 238 | 496.4 | 13.1 | 37.4 | 19.4 | 1.93 | 1.9 |
| 44 | 1.77 | 0.47  | 96  | 931 | 218 | 498.1 | 14.0 | 24.5 | 13.3 | 1.84 | 1.8 |
| 45 | 1.63 | 0.46  | 86  | 178 | 9   | 489.7 | 18.4 | 32.4 | 18.2 | 1.78 | 1.8 |
| 46 | 1.78 | 0.48  | 62  | 813 | 236 | 508.8 | 9.84 | 28.9 | 14.5 | 1.99 | 2.0 |
| 47 | 1.58 | 0.45  | 95  | 247 | 5   | 488.2 | 21.2 | 30.8 | 17.4 | 1.77 | 1.8 |
| 48 | 1.78 | 0.48  | 105 | 878 | 24  | 492.1 | 17.9 | 24.8 | 13.8 | 1.80 | 1.8 |
| 49 | 1.41 | 0.48  | 41  | 950 | 15  | 494.7 | 12.9 | 38.2 | 20.6 | 1.85 | 1.9 |
| 50 | 1.42 | 0.45  | 79  | 0   | 109 | 490.0 | 17.7 | 36.0 | 20.6 | 1.75 | 1.7 |
| 51 | 1.41 | 0.49  | 102 | 852 | 164 | 489.1 | 22.9 | 28.1 | 16.1 | 1.75 | 1.7 |
| 52 | 1.39 | 0.48  | 92  | 750 | 54  | 488.4 | 21.8 | 31.6 | 17.2 | 1.84 | 1.8 |
| 53 | 1.70 | 0.49  | 59  | 190 | 97  | 495.4 | 13.5 | 34.0 | 17.9 | 1.90 | 1.9 |
| 54 | 1.75 | 0.435 | 48  | 0   | 5   | 495.4 | 11.5 | 38.5 | 22.0 | 1.75 | 1.8 |
| 55 | 1.68 | 0.43  | 44  | 879 | 35  | 506.9 | 8.1  | 36.8 | 20.0 | 1.84 | 1.8 |

NB:
* = expressed in SI at 5 mm under illuminant C.

What is claimed is:

1. A colored soda-lime glass composed of glass-forming principal constituents and of coloring agents characterized in that it comprises coloring agents in the following percentages by weight, the total amount of iron expressed in the form Fe$_2$O$_3$:

| | |
|---|---|
| Fe$_2$O$_3$ | 1.2 to 1.85% |
| FeO | 0.4 to 0.50% |
| Co | 0.0020 to 0.0130% |
| Cr$_2$O$_3$ | 0 to 0.0240% |
| V$_2$O$_5$ | 0 to 0.1% |
| Se | 0 to 0.0015% | and has the following optical properties:

20%<TLA4<40%
15%<TE<25%
0%<TUV4<5%
480 nm<$\lambda_D$<520 nm
10%<P<20%
SE4>1.65.

2. The colored glass in accordance with claim 1, characterized in that it has a selectivity (SE4) of at least 1.70.

3. The colored glass in accordance with claim 1, characterized in that it has a selectivity (SE4) of at least 1.75.

4. The colored glass in accordance with claim 1, characterized in that it has a purity (P) of greater than 10%.

5. The colored glass in accordance with claim 1, characterized in that it contains, in addition to Fe, at least one coloring agent selected from the group consisting of Cr, Co, V, Se, Ti, Ce, Mn.

6. The colored glass in accordance with claim 1, characterized in that it has the following optical properties:

25%<TLA4<35%
15%<TE4<20%
0%<TUV4<3.5%
495 nm<$\lambda_D$<500 nm
10%<P<15%.

7. The colored glass in accordance with claim 1, characterized in that it has a TLA4 of less than 30%.

8. The colored glass in accordance with claim 1, characterized in that it has a TLA4 of less than 28%.

9. The colored glass in accordance with claim 1, characterized in that it comprises coloring agents in the following percentages by weight, the total amount of iron being expressed in the form of Fe$_2$O$_3$:

Fe$_2$O$_3$ 1.45 to 1.85%
FeO 0.40 to 0.45%
Co 0.0030 to 0.0120%
Cr$_2$O$_3$ 0.190 to 0.0230%
V$_2$O$_5$ 0.0350 to 0.0550%
Se 0 to 0.0010%.

10. The colored glass in accordance with claim 1, characterized in that its percentage by weight of FeO is greater than 0.42.

11. The colored glass in accordance with claim 1, characterized in that it has, for a thickness of 5 mm, a light transmission under illuminant C (TLC5) of between 15% and 35%.

12. The colored glass in accordance with claim 1, characterized in that it is coated with a layer of at least one metal oxide.

13. The colored glass in accordance with claim 1, characterized in that it is in sheet form.

14. A window for an automobile made in accordance with claim 1.

15. A laminated glazing made in accordance with claim 1.

* * * * *